(12) United States Patent
Lee et al.

(10) Patent No.: US 11,441,009 B2
(45) Date of Patent: Sep. 13, 2022

(54) FLEXIBLE POLYVINYL HALIDE USED FOR INJECTION OVER-MOLDING

(71) Applicant: Geon Performance Solutions, LLC, Avon Lake, OH (US)

(72) Inventors: Sang Lee, Avon Lake, OH (US); Ling Hu, Westlake, OH (US); Craig L. Shoemaker, Avon Lake, OH (US); Robert Schilling, Medina, OH (US)

(73) Assignee: GEON Performance Solutions, LLC, Westlake, OH (US)

( * ) Notice: Subject to any disclaimer, the term of this patent is extended or adjusted under 35 U.S.C. 154(b) by 179 days.

(21) Appl. No.: 16/469,453

(22) PCT Filed: Dec. 13, 2017

(86) PCT No.: PCT/US2017/066028
§ 371 (c)(1),
(2) Date: Jun. 13, 2019

(87) PCT Pub. No.: WO2018/112005
PCT Pub. Date: Jun. 21, 2018

(65) Prior Publication Data
US 2020/0040159 A1      Feb. 6, 2020

Related U.S. Application Data

(60) Provisional application No. 62/434,021, filed on Dec. 14, 2016, provisional application No. 62/465,537, filed on Mar. 1, 2017.

(51) Int. Cl.
| | | |
|---|---|---|
| *C08K 3/26* | (2006.01) | |
| *B29C 45/00* | (2006.01) | |
| *B32B 27/08* | (2006.01) | |
| *B32B 27/30* | (2006.01) | |
| *C08K 5/12* | (2006.01) | |
| *C08K 9/04* | (2006.01) | |
| *C08K 9/06* | (2006.01) | |
| *C08L 27/06* | (2006.01) | |
| *B29C 45/14* | (2006.01) | |
| *B29K 27/06* | (2006.01) | |
| *B29K 105/00* | (2006.01) | |
| *B29K 509/00* | (2006.01) | |

(52) U.S. Cl.
CPC ............ *C08K 3/26* (2013.01); *B29C 45/0001* (2013.01); *B32B 27/08* (2013.01); *B32B 27/304* (2013.01); *C08K 5/12* (2013.01); *C08K 9/04* (2013.01); *C08K 9/06* (2013.01); *C08L 27/06* (2013.01); *B29C 45/14* (2013.01); *B29K 2027/06* (2013.01); *B29K 2105/0038* (2013.01); *B29K 2509/14* (2013.01); *C08K 2003/265* (2013.01); *C08K 2201/005* (2013.01)

(58) Field of Classification Search
CPC ... C08K 3/26; C08K 9/04; C08K 9/06; C08K 5/12; C08K 2201/005; C08K 2003/265; C08L 27/06; B29C 45/14; B29C 45/0001; B32B 27/08; B32B 27/304
USPC .......................................................... 482/522
See application file for complete search history.

(56) References Cited

U.S. PATENT DOCUMENTS

| | | | |
|---|---|---|---|
| 2,996,489 A | 8/1961 | Dannis et al. | |
| 3,533,978 A | 10/1970 | Bullman et al. | |
| 3,829,396 A | 8/1974 | Oakes et al. | |
| 3,886,234 A * | 5/1975 | Ishihara | C08J 5/12 |
| | | | 525/193 |
| 4,506,049 A | 3/1985 | Mueller et al. | |
| 5,102,465 A | 4/1992 | Lamond | |
| 5,137,952 A | 8/1992 | Miller et al. | |
| 5,295,339 A | 3/1994 | Manner | |
| 5,298,558 A | 3/1994 | Sullivan et al. | |
| 5,338,788 A * | 8/1994 | Miyataka | C08K 5/205 |
| | | | 524/197 |
| 5,414,035 A | 5/1995 | Lindner et al. | |
| 5,552,484 A | 9/1996 | Enomoto | |
| 5,670,563 A | 9/1997 | Zinke et al. | |
| 5,861,211 A | 1/1999 | Thakkar et al. | |
| 5,969,015 A | 10/1999 | Zinke et al. | |
| 6,919,392 B1 | 7/2005 | Chenard et al. | |
| 7,939,006 B2 | 5/2011 | Shakir et al. | |
| 8,273,283 B2 | 9/2012 | Shakir et al. | |
| 8,575,247 B2 | 11/2013 | Shakir et al. | |
| 2003/0176544 A1 * | 9/2003 | Hawrylko | C08K 3/26 |
| | | | 524/180 |
| 2008/0045635 A1 | 2/2008 | Ishizuka et al. | |
| 2009/0239984 A1 | 9/2009 | Horton et al. | |
| 2010/0112288 A1 | 5/2010 | Shakir et al. | |
| 2011/0130496 A1 | 6/2011 | Shakir et al. | |
| 2011/0177293 A1 | 7/2011 | Shakir et al. | |
| 2014/0023824 A1 * | 1/2014 | Masanek, Jr. | E04F 15/105 |
| | | | 428/138 |
| 2016/0143273 A1 * | 5/2016 | Takahashi | A01N 31/08 |
| | | | 424/409 |
| 2016/0260519 A1 | 9/2016 | Horton et al. | |

FOREIGN PATENT DOCUMENTS

| | | |
|---|---|---|
| CA | 2404414 | 9/2002 |
| CN | 101608102 A | 12/2009 |

(Continued)

OTHER PUBLICATIONS

PVC, Wikipedia, last edited on Jul. 29, 2021. (Year: 2021).*

(Continued)

*Primary Examiner* — Hui H Chin
(74) *Attorney, Agent, or Firm* — Wolf, Greenfield & Sacks, P.C.

(57) ABSTRACT

A polyvinyl halide compound, alone or alloyed with thermoplastic polyurethane, is used as a flexible layer for over-molding a rigid polymer substrate. Selection of types and amounts of calcium carbonate for the overmolding layer improves peel strength to achieve cohesive failure of the flexible overmolding layer rather than adhesive failure of the interface between the flexible overmolding layer and the rigid polymer substrate.

38 Claims, No Drawings

(56) References Cited

FOREIGN PATENT DOCUMENTS

| CN | 102277106 A | 12/2011 |
|---|---|---|
| CN | 104263251 A | 1/2015 |
| CN | 104342071 A | 2/2015 |
| EP | 0 498 384 A2 | 8/1992 |
| EP | 0 587 104 A2 | 3/1994 |

OTHER PUBLICATIONS

Office Action for CN Application No. 201780076592.7 dated Dec. 16, 2020.
Lan, Study on the Interfacial Adhesion Mechanism of Laminated Flexible Composites Reinforced with Weaving Fabric. Chinese Master's Theses Full-text Database Engineering Science and Technology I. Oct. 15, 2009;10: 16 pages.
Wang, Adhesive User Manual. Chemical Industry Press. Jun. 1995: 6 pages.
Office Action for CA Application No. 3,046,090 dated Jul. 10, 2020.
International Search Report and Written Opinion for International Application No. PCT/US2017/066028 dated Mar. 29, 2018.
International Preliminary Report on Patentability for International Application No. PCT/US2017/066028 dated Jun. 18, 2019.
[No Author Listed], Geon HTX 66311 Natural. Technical Data Sheet. PolyOne Corporation. Apr. 2001:2 pages.
[No Author Listed], Geon M3850. PolyOne Technical Data Sheet. PolyOne Corporation. May 2001:2 pages.
[No Author Listed], Geon Rigid Vinyl Molding Compounds Processing Guide. Technical Service Report No. 71. PolyOne Corporation. Apr. 1998:6 pages.
[No Author Listed], Injection Molding Compound Processing Guide. Technical Service Report No. 51. PolyOne Corporation. Dec. 1996:10 pages.
Office Action for Canadian Application No. 3,046,090 dated Mar. 11, 2021.
Office Action for CA Application No. 3,046,090 dated Oct. 1, 2021.
Office Action for CN Application No. 201780076592.7 dated Oct. 11, 2021.
Lu, Plastic Doors and Windows Engineering. China Building Materials Press. Mar. 31, 2005:149. 3 pages.
Xu et al., Application of Modified Calcium Carbonate in PVC-Coated Fabrics. Plastics Manufacturing. Oct. 2006;10:25-27.
Office Action for CN Application No. 201780076592.7 dated Jun. 6, 2022.

* cited by examiner

US 11,441,009 B2

FLEXIBLE POLYVINYL HALIDE USED FOR INJECTION OVER-MOLDING

CLAIM OF PRIORITY

This application is a national stage filing under 35 U.S.C. § 371 of International Application No. PCT/US2017/066028, filed Dec. 13, 2017, and entitled "Flexible Polyvinyl Halide Used for Injection Over-Molding", which claims the benefit of U.S. Provisional Patent Application Ser. No. 62/434,021 and filed on Dec. 14, 2016, and U.S. Provisional Patent Application Ser. No. 62/465,537 and filed on Mar. 1, 2017, each of which is hereby incorporated by reference in its entirety.

FIELD OF THE INVENTION

This invention relates to formulations of plasticized polyvinyl halide, particularly flexible polyvinyl chloride, as a layer in a two component laminate made by overmolding the flexible polyvinyl halide layer onto a polymeric substrate or layer, particularly rigid polyvinyl chloride.

BACKGROUND OF THE INVENTION

People benefit from plastic articles. From their invention in the mid-20th Century until the present, thermoplastic polymers have become the composition of many consumer products. Such products are relatively lightweight, sturdy, and corrosion resistant.

Plasticized poly(vinyl chloride), invented by Waldo Semon of B.F. Goodrich, has been a top performing plastic resin for decades. Billions of kilograms of poly(vinyl chloride) (also known as "PVC") resin are molded and extruded each year into countless products. With conventional additives, poly(vinyl chloride) provides unparalleled durability, flame resistance, chemical resistance, weatherability, electrical properties, and clarity, to name a few.

For example, wire and cable manufacturers often use plasticized PVC for insulation and sheathing. Performance of plasticized PVC compound at various temperatures is predicted based on accelerated oven aging tests. A cable rated at 60° C. by Underwriters' Laboratories (UL) is tested at 100° C. for seven days, whereas a cable rated at 75° C. is tested at 100° C. for ten days. Some plasticizers conventionally used are phthalates, citrates, soyates, and trimellitates.

Wire and cable is made by extrusion. Polyvinyl chloride containing plasticizer or no plasticizer can also be injection molded into final-shape, three dimensional articles.

The polymer forming industry is also aware of overmolding of two different types of polymers. The different types of polymers are a rigid polymeric substrate and an elastic or flexible overmolding layer. Often, a thermoplastic elastomer such as a styrenic block copolymer is overmolded on a polyolefin or polyamide net-shape substrate via injection molding to provide a soft grip surface on a plastic article, such as the cap of an analgesic container for persons who have difficulty in twisting open such containers. Overmolding is distinguished from concurrent injection molding to two different types of polymers, also called co-injection molding.

SUMMARY OF THE INVENTION

Surprisingly, over the years of use of polyvinyl chloride polymers, overmolding has not been intensively studied and commercially used. While co-extrusion of two different PVC polymer compounds is widely known and used, overmolding of flexible polyvinyl halide compound onto a pre-existing shaped article of rigid polyvinyl halide compound has not become commercialized.

Polyvinyl halide, especially PVC, because of its properties stated above, would be a good candidate if made flexible enough for overmolding onto a rigid polymer, especially PVC, in order that a relatively less expensive overmolded polymer combination could be used in the market where the thermoplastic elastomer/polyolefin overmolded combination is often used in an over-engineered fashion.

Overmolding requires very good adhesion at the interface between the overmolding layer and the overmolded substrate. Good interfacial adhesion results in cohesive failure of the overmolding layer while bad adhesion results in adhesive failure at that interface between flexible and rigid materials.

The more preferred failure mechanism is cohesive failure, where the bond of the flexible layer and the rigid substrate is much stronger than the mechanical strength of the flexible layer itself. That preference demonstrates that the bond between the overmolding layer and the overmolded substrate at the interface is stronger than the polymer compound itself forming the overmolding layer.

What the art needs is a flexible polyvinyl halide material which can be inexpensively made and acceptably used as an overmolding layer over a rigid polymer substrate, particularly rigid PVC.

It has been found that choice of polyvinyl halide of a particular inherent viscosity and a particular type of calcium carbonate filler, with plasticizers also present, can provide an acceptable flexible overmolding layer for injection overmolding to make a variety of polymer articles having a strong core and a flexible covering.

One aspect of this disclosure is a polymer compound, comprising (a) polyvinyl halide having an inherent viscosity of less than about 0.9 dl/g, as measured by using 0.2 grams of resin in 100 ml of cyclohexanone at 30° C. according to test method ASTM D 1243; (b) an effective amount of plasticizer to provide a desired amount flexibility to the polyvinyl halide and form a plasticized polyvinyl halide compound; and (c) an effective amount of stearic acid- or silane-treated calcium carbonate filler dispersed in the plasticized polyvinyl halide compound; wherein when the plasticized polyvinyl halide compound is overmolded as a layer onto a Rigid PVC Test Substrate and undergoes a Modified ASTM D903 Adhesion Peel Strength Test, the layer of the plasticized polyvinyl halide compound experiences cohesive failure.

Another aspect of this disclosure is an overmolded polymer article comprising the layer of claim 1 and a layer of rigid polyvinyl halide.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

Polyvinyl Halide Resins for Overmolding Layer

Any polyvinyl halide capable of being sufficiently flexible is a candidate for use in this invention as the overmolding layer. Polyvinyl halides are advantageous because they have inherent flame retardant properties arising from the presence of halide moieties which naturally retard onset and continuity of combustion in the presence of oxygen.

Polyvinyl halides are essentially homopolymers or copolymers of vinyl halide, particularly chloride, with minor amounts of other co-monomers, if any. The most common polyvinyl halide is polyvinyl chloride (PVC) which is one of most common types of thermoplastic used from the mid-20$^{th}$ Century to the present.

PVC comprises polymerized vinyl chloride monomer where preferred polymers are essentially homopolymerized vinyl chloride with little or no copolymerized co-monomers. Useful co-monomers, if desired, include mono-unsaturated ethylenically unsaturated monomer copolymerizable with vinyl chloride monomer by addition polymerization. Useful co-monomers include other vinyl monomers such as vinyl acetate, ethers, and vinylidene chloride. Other useful co-monomers comprise mono-ethylenically unsaturated monomers including acrylics such as lower alkyl acrylates or methacrylates, acrylic and methacrylic acid, lower alkenyl olefins, vinyl aromatics such as styrene and styrene derivatives, and vinyl esters and ethers. Typical useful commercial co-monomers include acrylonitrile, 2-ethylhexyl acrylate, vinylidene chloride, and isobutyl ether. Useful PVC copolymers can contain from about 0.1% to about 10% or 15%, preferably from about 0.5% to about 5%, by weight of copolymerized co-monomer.

Preferred PVCs as starting materials are suspension polymerized vinyl chloride, although less preferred mass (bulk) polymerized can be useful. Rigid PVCs are distinguished from flexible PVCs in that former contain essentially no plasticizer. But the grade of PVC for use in the overmolding layer has particular requirements other than merely the presence or absence of plasticizer.

Useful weight average molecular weights of PVCs can be from about 39,000 to about 150,000, and preferably from about 45,000 to about 65,000, where the molecular weight is measured by size exclusion chromatography and correlated to absolute PVC molecular weights determined by Perkins et al., Journal of Vinyl Technology, Vol. 15, No. 2 (1993).

The PVC resin can have an inherent viscosity ("IV") from about 0.58 to about 1.15, desirably from about 0.60 to about 0.9, and preferably from about 0.65 to about 0.85 as measured by using 0.2 grams of resin in 100 ml of cyclohexanone at 30 degrees C. by ASTM D 1243. It has been found that a PVC resin having an inherent viscosity of higher than 0.9 is unacceptable because the overmolding materials using PVC of IV higher than 0.9 showed lower adhesion bond to the substrate which might be due to higher melting viscosity.

The PVCs of this invention have a K Value ranging from about 52 to about 74 and preferably from about 55 to about 63.

Commercially available PVC resins can be used meeting the specifications stated above. Non-limiting sources of commercial PVC resin are ShinTech of Houston, Tex. USA; Kaneka Texas Corporation of Pasadena, Tex., USA; and Oxyvinyls, LLC of Dallas, Tex., USA.

Other PVCs useful in this invention can be alloys of PVC and thermoplastic polyurethanes (TPUs).

The TPU polymer type used in this invention can be any conventional TPU polymer that is known to the art and in the literature as long as the TPU polymer has adequate number average molecular weight of from about 80,000 to about 800,000 and preferably from about 90,000 to about 450,000.

The TPU polymer is generally prepared by reacting a polyisocyanate with an intermediate such as a hydroxyl terminated polyester, a hydroxyl terminated polyether, a hydroxyl terminated polycarbonate or mixtures thereof, with one or more chain extenders, all of which are well known to those skilled in the art.

The hydroxyl terminated polyester intermediate is generally a linear polyester having a number average molecular weight (Mn) of from about 500 to about 10,000, desirably from about 700 to about 5,000, and preferably from about 700 to about 4,000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from e-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like, 1,4-butanediol is the preferred glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethyl glycol) comprising water reacted with tetrahydrofuran (PTMG). Polytetramethylene ether glycol (PTMEG) is the preferred polyether intermediate. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn), as determined by assay of the terminal functional groups which is an average molecular weight, of from about 500 to about 10,000, desirably from about 500 to about 5,000, and preferably from about 700 to about 3,000.

Alloys of PVC and TPU can have a ratio of from about 100:20 to about 100:150 and preferably from about 100:20 to about 100:60 of PVC:TPU.

Commercially available TPUs can be used. Non-limiting sources of commercial TPU resin are Huntsman, BASF, Lubrizol Corporation and Covestro, all well-known multi-national companies.

Compounds of Polyvinyl Halide Resins for Overmolding Layer

Thermoplastic resin compounds typically contain a variety of additives selected according to the processing or performance requirements of the article produced therefrom well within the understanding of one having ordinary skill in the art without the necessity of undue experimentation. Two required additives for this invention are plasticizers and fillers such as calcium carbonate.

Plasticizers Useful for Overmolding Polyvinyl Halide Compounds

Plasticizers may be included in any manner and amount to affect the Shore A Durometer and flexibility of the overmolding layer compound.

Exemplary plasticizers are set forth in The Technology of Plasticizers, by Sears and Darby, pages 893-1085, John Wiley and Sons, New York, 1982, which is incorporated herein by reference. Any of the phthalates, citrates, soyates, or trimellitates used in PVC polymer compounding are acceptable candidates as plasticizers for this invention. Plasticizers can be present in a broad range of amounts in the PVC based on the Shore hardness property desired as known to those persons having ordinary skill in the art without undue experimentation. Within conventional Shore hardness ranges, plasticizers can be present in amounts ranging from about 20 to about 150 and preferably from about 40 to about 100 parts per hundred resin (PHR).

Commercial sources of plasticizers, both petrochemical and bio-derived, include ExxonMobil Corporation for phthalates, BASF for trimellitates and polymeric plasticizers, and PolyOne Corporation for citrates and soyates.

Calcium Carbonate Fillers Useful for Overmolding Polyvinyl Halide Compounds

Calcium carbonate is one of the more common minerals on earth. Calcium carbonate can take the form of limestone or marble ore. In PVC compounding, it has been found that Caribbean calcium carbonates are preferred over calcium carbonates mined from limestone or marble ore deposits in the United States or chalk deposits in England or Europe in that the Caribbean calcium carbonates are mined from soft and friable, finely divided, chalk-lines marine sedimentary deposits frequently occurring as surface deposits in the Caribbean area.

Other calcium carbonates not from the Caribbean also useful in this mixture.

Caribbean calcium carbonates are high purity, finely divided, fine particle size friable deposits described as Caribbean micritic limestone is sedimentary in origin comprising a combination of reef limestone deposits of reef fossil fragments, betrital deposits of fibrous skeletal and non-skeletal grains, micrite deposits of naturally formed precipitated calcium carbonate in beds or matrix with betrital, and chalk deposits of disarticulated caccolith fragments. The disclosure of U.S. Pat. No. 5,102,465 is hereby fully incorporated by reference.

Caribbean micritic calcium carbonates are soft and friable, chalk-like consistency, sedimentary deposits comprising reefs, betritals, micrite and chalky deposits. Caribbean calcium carbonate deposits tend to agglomerate in the natural sedimentary state but can be readily broken down or commutated to produce rounded porous particles comparable to naturally occurring Caribbean calcium carbonate particles less than about 6 microns.

Useful Caribbean calcium carbonates have a particle size less than about 10 microns, desirably about 6 microns or less, preferably having a typical particle size distribution of about 70% less than about 3 microns, where particles from about 1 to about 3 microns are most preferred. Smaller particles increase the surface area and in turn increases the scavenger effectiveness against PVC degradation. Caribbean micritic calcium carbonates are found throughout the Caribbean basin with significant deposits found in Haiti and Jamaica. Caribbean micritic calcium carbonates, especially Jamaican origin, are very high in purity typically exhibiting above 98% and typically more than about 99% pure calcium carbonate, with minimal amounts of impurities.

Jamaican micritic calcium carbonate is preferred and characteristically contains high purity calcium carbonate, typically more than about 99% by weight pure calcium carbonate, and commonly mined from surface sedimentary chalky marine deposits of friable fragile agglomerated particles. The deposits can be subsequently wet or dry ground by grinding for instance by a hammer mill followed by ball mill grinding to obtain the small particle size. Useful Jamaican micritic calcium carbonates can be obtained directly by grinding without using a chemical precipitation processing commonly used in the U.S. with U.S. limestone and marble deposits. U.S. deposits also typically contain perceptible levels of iron which can promote discoloration and degradation of PVCs. In contrast, Caribbean and Jamaican micritic calcium carbonates are free of measureable amounts of iron.

At about six microns or below, the ground calcium carbonate particles are hydrophobic and become more effective with decreasing particle sizes. Most preferred particles sizes are about predominately about 3 microns or below for rendering adhesive the overmolding layer to the substrate in accordance with this invention, while particles less than about 1.5 microns are best. Moreover, calcium carbonate treated with coupling agents such as stearic acid or silane or both can show much stronger adhesion than non-treated calcium carbonate.

Purity of the ground particles on a weight basis ordinarily is above about 99%, typically above about 99.3% pure calcium carbonate, essentially free of iron (that is less than about 0.5% or less than about 0.2%, or nil), and with minimal impurities of less than about 1.0% or about 0.4% magnesium carbonate, less than about 0.1% crystalline silicates, and less than about 0.3%, acid insolubles, if any.

Preferred useful commercial Jamaican calcium carbonates are Optifil and Optifil T treated calcium carbonates supplied by J. B. Huber Co. and described as 99% pure, virtually free of crystalline silica and other impurities such as magnesium carbonate and silicates, and free of other metals such as iron. Published physical properties of Optifil and Optifil T calcium carbonates from Jamaica are as follows in Table 1.

TABLE 1

| | |
|---|---|
| Grind (Hegman) | 6 microns (μm) |
| Oil absorption | 17 lbs/100 lbs (Optifil) |
| | 16 lbs/100 lbs (Optifil T) |
| Moisture | 0.2% |
| Specific surface area | 3.45 m²/gm |
| Calcium carbonate | 99% |
| Magnesium carbonate | 0.4% |
| Crystalline silica | 0.1% maximum |
| Silicates | 0.2% maximum |

Other calcium carbonates are useful, such as those used in the Examples, namely:

Ground and uncoated calcium carbonate, particle size from 2.5 to 3.5 μm, available from either Imerys or Omya Inc. but only if used together with a treated calcium carbonate in which the treated calcium carbonate is the dominant calcium carbonate used.

KOTAMITE, 3.0 μm Treated GCC calcium carbonate, available from Imerys.

Omyacarb UFT, 1 μm GCC treated calcium carbonate, available from Omya.

Omyacarb FT, 1.4 μm wet GCC calcium carbonate, available from Omya.

Magnum Gloss SAT, 0.4 μm PCC treated calcium carbonate, available from Mississippi Lime.

Magnum Gloss M, 0.4 μm PCC non-treated calcium carbonate, available from Mississippi Lime did not work.

In accordance with this invention, an effective amount of at least about 64 weight parts of calcium carbonate, advantageously between about 64 and about 150 weight parts, and preferably between about 70 and about 100 weight parts are compounded with 100 weight parts of polyvinyl halide resin to obtain desired effective results of this invention. Too much calcium carbonate fillers in the PVC compound reduces flexibility, but too little calcium carbonate fillers does not provide enough adhesive strength when overmolded with the rigid polymeric substrate.

Other Optional Additives

The compound of the present invention can include conventional plastics additives in an amount that is sufficient to obtain a desired processing or performance property for the compound.

The amount of any optional additive should not be wasteful of the additive or detrimental to the processing or performance of the compound. Those skilled in the art of thermoplastics compounding, without undue experimentation but with reference to such treatises as Plastics Additives Database (2004) from Plastics Design Library (www.elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; processing aids; release agents; silanes, titanates and zirconates; slip and anti-blocking agents; stabilizers; stearates; ultraviolet light absorbers; viscosity regulators; waxes; and combinations of them.

If there is no appreciable loss of adhesion in the overmolded final shape, using PVC as only one possible embodiment, PVC compounds suitable for use in this disclosure can contain effective amounts of additives ranging from none at all, namely 0, to about 15 weight parts per 100 weight parts of PVC (PHR).

For example, various primary and/or secondary lubricants such as oxidized polyethylene, paraffin wax, fatty acids, and fatty esters and the like can be utilized. Effective amounts of lubricant range from about 0 to about 5 and preferably from about 0 to about 1.5 PHR.

Thermal and ultra-violet light (UV) stabilizers can be utilized such as various organo tins, for example dibutyl tin, dibutyltin-S—S'-bi-(isooctylmercaptoacetate), dibutyl tin dilaurate, dimethyl tin diisooctylthioglycolate. Secondary stabilizers may be included for example a metal salt of phosphoric acid, polyols, and epoxidized oils. Specific examples of salts include water-soluble, alkali metal phosphate salts, disodium hydrogen phosphate, orthophosphates such as mono-, di-, and tri-orthophosphates of said alkali metals, alkali metal polyphosphates, -tetrapolyphosphates and -metaphosphates and the like. Polyols such as sugar alcohols, and epoxides such as epoxidized soya oil can be used. Typical levels of secondary stabilizers range from about 0.1 wt. parts to about 7.0 wt. parts per 100 PHR.

In addition, antioxidants such as phenolics, BHT, BHA, various hindered phenols and various inhibitors like substituted benzophenones can be utilized. Effective amounts of antioxidants can range from about 0 to about 2 and preferably from about 0 to about 1.0 PHR Blowing agents expand during processing to generate gas-filled cavities in a polymer. Exothermic blowing agents, endothermic blowing agents, or both can be used in the present invention to generate a foamed extruded article from the PVC compound of the present invention. The blowing agent can be added to the PVC compound or can be added to the extruding or injection molding equipment with the PVC compound. Thus, for purposes of this invention, the blowing agent is an optional ingredient for the flexible PVC compound of the present invention even if it is a required ingredient to make a foamed PVC extruded article. Thus, a "foamable" PVC compound of the present invention optionally has blowing agent included.

Non-limiting examples of endothermic blowing agents are polycarbonic acids, coating sodium bicarbonate, coated citric acid, coated mono sodium citrate, and coated sodium citrate.

Exothermic blowing agents include azodicarbonamides, modified azodicarbonamides, oxybis benzene sulfony hydrazide (OBSH), toluenesulfonyhydrazides (TSH), 5-pheyltetrazole (5-PT), diisopropylhydrazodicarboxylate (DIHC), and dinitrosopentamethylenetetramine (DNPT).

Suitable commercially available blowing agents are available from Mats Corp. Ltd. of Markham, Ontario as MS01, Cenblo Mat 100 or 500 (a carboxylic acid and carbonate based product), Uniroyal Chemical Company, Inc. of Middlebury, Conn., as Expandex® 5 PT (a 5-phenyl tetrazole based product), EPI Environmental Plastics Inc. of Conroe, Tex., as EPIcor, Uniroyal Chemical Company of Middlebury, Conn., as Expandex and Reedy International Corp. of Keyport, N.J. as Safoam. A particularly preferred commercial blowing agent is Porofor ADC/MCI brand blowing agent from Bayer. When included, blowing agents are generally added in amounts of from about 0.01 to about 1 PHR of PVC and preferably from 0.1 to 0.8 PHR of blowing agent are employed for extruded profiles such as louvers.

Examples of various pigments include titanium dioxide, carbon black and the like. Effective amounts of pigments can range from about 0 to about 20 and preferably from about 0 to about 5 PHR.

Processing of the Polyvinyl Halide Compound for the Overmolding Layer

The preparation of compounds of the present invention is uncomplicated. The compound of the present invention can be made in batch or continuous operations, for later injection overmolding.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm and temperature of mixing can be ambient. Also, the output from the mixer is chopped into smaller sizes for later extrusion or molding into polymeric articles.

Alternatively, mixing in a batch process typically occurs in a Henschel mixer that mixes via mechanical action rather than bringing the polymer matrix a melting temperature. The mixing speeds range from 60 to 1000 rpm and temperature of mixing can be ambient. Also, the output from the mixer in powder form can be used as is or fed into a compounding machine and chopped into smaller sizes for later extrusion or molding into polymeric articles.

Subsequent extrusion or molding techniques are well known to those skilled in the art of thermoplastics polymer engineering. While one should not expose the thermoplastic compounds to needless heat histories, the preparation of pellets of the PVC compound is suitable for efficient manufacturing. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com), one can make articles of any conceivable shape and appearance using compounds of the present invention.

Compounds for Overmolded Substrate

Any durable polymer capable of being injection molded and have rigidity more than the overmolding polyvinyl halide layer is a candidate for use in the present invention. Without undue experimentation, one having ordinary skill in the art could formulate a compound suitable for injection overmolding in fashion to determine the adhesion peel strength of the overmolding polyvinyl halide layer thereto.

Because the overmolding layer is made of polyvinyl halide, it is logical that acceptable compounds for the overmolded substrate can also be made of polyvinyl halide, preferably either the same or similar as the polyvinyl halide resin in the overmolding layer, except for the presence of the plasticizer in the overmolding layer to provide flexibility.

All of the various possible polyvinyl halide compounds described for use in the overmolding layer are also possible compounds for the rigid overmolded substrate, again less the plasticizer or any other additive detracting from the durability and structural integrity, melt flow, and other requirements of processing, performance or both.

Though no appreciable amount of the plasticizer is desirable for the overmolded compound, it is possible for the overmolded compound to benefit from the use of the calcium carbonate amounts ranging from about 0 to about 50 and preferably from about 0 to about 20 PHR. Because the calcium carbonate in the flexible overmolding layer increases adhesion strength, calcium carbonate in the rigid overmolded substrate also can contribute to adhesion strength at the interface of the two layers.

Overmolding Processing

Those having ordinary skill in the art of polymer processing, particularly injection overmolding processing, can recognize that the equipment for injection overmolding of a flexible layer to a rigid substrate of other polymers can also be applicable to poly(vinyl halide) overmolding layers on to polymeric substrates.

Injection overmolding typically has ranges of settings as seen in Table 2, when PVC is used.

TABLE 2

| Molding Condition | Acceptable Range for PVC Overmolding Layer on to PVC Overmolded Substrate |
|---|---|
| Rear Barrel Temperature, °F. | From about 310 to about 350 and preferably from about 320 to about 340. |
| Center Barrel Temperature, °F. | From about 320 to about 350 and preferably from about 330 to about 340. |
| Front Barrel Temperature, °F. | From about 330 to about 350 and preferably from about 340 to about 350. |
| Nozzle Barrel Temperature, °F. | From about 330 to about 350 and preferably from about 340 to about 350. |

Other variables for molding conditions are dependent on either the machine or the nature of the part to be molded. Without undue experimentation, a person having ordinary skill in the art can determine these variables for each combination of machine and molded part.

Usefulness of the Invention

Any plastic article made by injection molding is a candidate for use of any laminate of the various overmolding layers and overmolded substrates in combination as disclosed above. Particularly useful are those plastic articles which require both sturdiness and durability from the overmolded substrate and flexibility and tactile benefits from the overmolding layer.

Articles with need for gripping by the human hand lead the likely candidates to be made from the compounds of the present invention. From hand tools to handle bars, from pill containers to ice chests, the combination of performance properties of "over" layer and "under" layer allows for the plastic article designer to utilize formulations contemplated by this disclosure.

The overmolding layer need not cover the entire overmolded substrate. Indeed, there are many situations where the properties of the overmolding layer are detrimental to the outer surface of the exposed overmolded substrate which does not require the flexibility and tactile sensations required at the surfaces of the overmolding layer. For example, one can guide the human hand to the correct location of proper leverage of a hand tool by arranging the overmolding layer to cover the overmolded substrate only at the preferred location. The same concept is also true for golf clubs, axes, exercise equipment, and the like.

Also, the polymeric article need not be only two layers of flexible overmolding layer and rigid overmolded substrate. Different surfaces of the substrate can be overmolded with different flexible overmolding layers to provide more versatility of specialized polymeric materials. For example, a hand tool can have one overmolding layer of one formulation where the palm contacts the tool and a second overmolding layer of a second formulation where the fingers grip the tool. If used in low-light conditions, the flexibility and tactility of the different layers can signal the orientation of the hand tool in the hand.

EXAMPLES

Modified ASTM D903 Adhesion Peel Strength Test

Adhesion Peel Strength Test Method ASTM D903 for 180° peel adhesion was modified as described here for testing adhesion between flexible PVC laminate and rigid PVC and defined for this purpose as "Modified ASTM D903 Adhesion Peel Strength Test".

The rigid PVC chosen for the test, and defined for this purpose to be "Rigid PVC Test Substrate", was Geon™ Resilience™ HC8220 White 1612 rigid PVC from PolyOne Corporation. Key properties of this grade of PVC, in SI typical values, are: Specific Gravity: 1.33 (ASTM D792); Spiral Flow: 86.4 cm; Molding Shrinkage—Flow: 0.20-0.5% (ASTM D955); Tensile Modulus: 2690 MPa (ASTM D638, Type 1 51 mm/min); Tensile Strength Yield: 48.3 MPa (ASTM D638, Type 1 51 mm/min); Tensile Strength Elongation: 22% (ASTM D638, Type 1 51 mm/min); Flexural Modulus: 2760 MPa (ASTM D790); Flexural Strength: 75.8 MPa (ASTM D790); Notched Izod Impact at −18° C. and 3.18 mm, Injection Molded: 110 J/m (ASTM D256A); Notched Izod Impact at 0° C. and 3.18 mm, Injection Molded: 690 J/m (ASTM D256A); Notched Izod Impact at 23° C. and 3.18 mm, Injection Molded: 1100 J/m (ASTM D256A); Durometer Hardness in Shore D scale: 79 (ASTM D2290); Deflection Temperature under Load at 0.45 MPa, unannealed and 3.18 mm: 68.9° C. (ASTM D648); Deflection Temperature under Load at 0.45 MPa, annealed and 3.18 mm: 72.8° C. (ASTM D648); Deflection Temperature under Load at 1.8 MPa, unannealed and 3.18 mm: 68.9° C. (ASTM D648); Deflection Temperature under Load at 1.8 MPa, annealed and 3.18 mm: 72.8° C. (ASTM D648); RTI Elec: 50.0° C. (UL 746); RTI Imp: 50.0° C. (UL 746); RTI Str: 50.0° C. (UL 746); and Processing (Melt) Temp.: 199-210° C.

Sample Preparation By Injection Molding:

(1) injection mold Geon™ Resilience™ HC8220 White 1612 rigid PVC into a 3 inch×6.5 inch×0.125 inch (7.62 cm×16.51 cm×0.317 cm) plaque using an 85T Van Dorn molding machine.

(2) then use transparent tape to cover about 3"×2" (7.62 cm×5.08 cm) area of the molded Geon™ HC8220 White 1612 plaque used as the substrate in the Series I Experiments (Comparative Examples A-E and Example 1). (Based on Series 1 Experiment, the cover area of the molded Geon™ HC8220 White 1612 plaque by transparent tape was adjusted from 3"×2" (7.62 cm×5.08 cm) to about 3"×4" (7.62 cm×10.16 cm) area used as substrate to keep each specimen slightly longer than 2" (5.08 cm) in the remaining experiments.)

(3) Next, injection over-mold of the various flexible PVC materials of the examples onto the molded Geon™ HC8220 White 1612 plaque with about 0.045" (0.1143 cm) thickness of flexible PVC layer using molding conditions identified in the Tables.

(4) Finally cut a flexural bar of 1" (2.54 cm) wide out of the final molded parts for the Modified ASTM D903 Adhesion Peel Strength Test.

Test Procedure of Modified ASTM D903 Adhesion Peel Strength Test:

ASTM D903 Adhesion Peel Strength Test Method (which can be seen at youtube.com/watch?v=wxCdtIisXxQ as of the filing date of this application) was modified to measure peeling strength of the various flexible PVC molding layers of about 0.045" (0.1143 cm) thickness from the overmolded Geon™ HC8220 White 1612 substrate using an Instron™ 4204 testing machine.

The differences between the official ASTM D903 method and the modified one are in that (1) the sample used in ASTM D903 is longer than the 2" (5.08 cm) sample as used in the modified one and (2) testing is terminated on a half way of the sample length in ASTM D903 whereas in the modified method, testing was terminated when the sample was peeled off from the substrate due to either adhesive failure or cohesive failure.

6"/min (15.24 cm/min) was used as pulling speed.

Five samples for each Comparative Example and Example were tested, and the results averaged. The numerical results are expressed in pound-force per inch (lbf/in) units, wherein each pound-force per inch equals 0.175127 Newtons per millimeter (N/mm).

Observation of Results:

Adhesive failure was not desired where the bond of the flexible overmolding layer to the substrate was not so strong that a failure occurred at the interface between the flexible PVC overmolding layer and the rigid PVC substrate causing the flexible material to be peeled off from the substrate during peeling test without loss of integrity or leaving of any amount of the black flexible overmolding layer on the white rigid substrate.

On the other hand, cohesive failure was desired where the bond of the overmolding layer to the substrate exceeded the internal strength of the flexible PVC layer so that the flexible PVC layers were broken during the peeling test with portions of the overmolding layer remaining adhered to the substrate. The remaining flexible overmolding layer fragments were black as compared with the white rigid substrate. In other words, the integrity of the PVC overmolding layer itself failed before the adhesive bond between the flexible PVC overmolding layer and the rigid PVC overmolded substrate.

In the case of cohesive failure, because the measured peeling strength reflected more internal mechanical strength other than actual bond strength, the peeling strength for all flexible PVC layers was reported as greater than the measured peeling strength in this patent application.

Comparative Examples A-E and Example 1

Table 3 shows the preparation and results of Comparative Examples A-E and Example 1.

Inherent Viscosity or IV is measured using ASTM D1243 test method and expressed in dl/g units.

Comparative Examples A and B and Example 1 explored the performance of the overmolding layer based on the differences in inherent viscosity of the PVC resin. Comparative Examples A and B showed that an inherent viscosity of the PVC resin should not be more than about 0.79, because the Modified Peel Strength Test showed that the formulation of Example 1 had a higher peel strength but also with cohesive failure instead of adhesive failure.

Comparative Examples C and D and Example 1 explored the performance of using calcium carbonate fillers with a PVC resin for all three which had an inherent viscosity of about 0.79. The Modified ASTM D903 Adhesion Peel Strength Test results showed that calcium carbonate is necessary for acceptable bonding strength at the interface between the rigid overmolded substrate and the flexible overmolding layer. The type of plasticizer was not a controlling factor.

Comparative Examples A, B, E, and Example 1 all used the same amount of a mixture of calcium carbonate fillers, all more that about 64 PHR. Example 1 was the only one to peel acceptably because of the inherent viscosity of the PVC resin of about 0.79.

Comparative Example E showed that the use of a blowing agent could not overcome the higher inherent viscosity of the PVC resin to provide an acceptable test result because Comparative Example E only showed adhesive failure, no cohesive failure.

Comparative Example F and Examples 2-10

This series of experiments shown in Table 4 explored the use of a variety of calcium carbonate fillers in a PVC resin having an IV of about 0.79 dl/g with the same rigid PVC overmolded substrate described for Example 1. All of the calcium carbonate choices were commercially available. The result found is that untreated calcium carbonate filler cannot be the dominant amount of calcium carbonate used in the formulation. Only Comparative Example F, which had no treated calcium carbonate, was not acceptable in peel strength as tested.

Without being limited to a particular theory, it is believed that the treatment of calcium carbonate provides better dispersion of fillers in PVC matrix and hence more homogenous surface so as to result in better adhesion of the flexible overmolding layer to the rigid overmolded substrate.

Examples 11-16 and Comparative Examples G-H

This series of experiments shown in Table 5 explored the use of a variety of amounts of a single calcium carbonate filler in a PVC resin having an IV of about 0.79 dl/g with the same rigid PVC overmolded substrate described for Example 1. The series also explored alternative plasticizers of various types and use of second PVC, a Geon E-44 DE-glossing PVC resin. The result found is that treated calcium carbonate at 40 or less PHR (Comparative Examples G and H) was insufficient for peel strength due to adhesive failure, and that treated calcium carbonate at 80 and above PHR (Examples 15 and 16) had increasing peel strength with experiencing cohesive failure during peeling strength test. Therefore, the amount of calcium carbonate in the overmolding layer can range from about 45 to about 150 and preferably from about 60 to about 100 PHR.

The results of Examples 11, 12, 13 and 14 showed that plasticizer type and use of the Geon E-44 to replace part of PVC, was not significant to the determination of peel strength. All these four Examples exhibited cohesive failure.

Examples 17-20 and Comparative Examples I-J

Comparative Examples I and J and Examples 17-20 explored the performance of a PVC/TPU alloy as the overmolding layer based on the differences in use of treated calcium carbonate. Comparative Examples I and J showed that the absence of calcium carbonate in the PVC/TPU alloy compound caused no cohesive strength, as compared with Examples 17-20. It is also noted that Example 17 had some attributes of both cohesive failure and adhesive failure, indicating that 40 parts per hundred of PVC resin is the practical lower limit of calcium carbonate loading to provide an acceptable polymer compound. In comparison of the peel strengths of Examples 17-19, it is noted that the progression of 40 parts (Ex. 17) to 64 parts (Ex. 18) achieved higher peel strength with adhesion failure mode transition from the combined adhesive and cohesive failure mode to the cohesive failure mode whereas from 64 parts (Ex. 18) to 80 parts (Ex. 19) did not achieve even higher measured peel strength but still with cohesive failure mode.

A comparison between Ex. 18 and Ex. 20 demonstrates how similar performance results can be achieved when using similar amounts of different types of plasticizer, although the TOTM plasticizer used in Ex. 18 in five more parts in the formulation yielded a higher peel strength.

Table 6 shows the results of these Examples and Comparative Examples.

TABLE 3

| Ingredients | Comp. A | Comp. B | Example 1 | Comp. C | Comp. D | Comp. E |
|---|---|---|---|---|---|---|
| SUSP RESIN OV240 PVC resin from Oxyvinyls (K Value: 70, IV: 1.02) | 100.00 | | | | | |
| SUSP RESIN OV220F PVC resin from Oxyvinyls (K Value: 67, IV: 0.92) | | 100.00 | | | | 100.00 |
| SUSP RESIN OV195F PVC resin from Oxyvinyls (K Value: 60, IV: 0.79) | | | 100.00 | 100.00 | 100.00 | |
| MARK 4716, Barium zinc phosphite liquid stabilizer from Galata Chemicals | 2.00 | 2.00 | 2.00 | 2.00 | 2.00 | 2.00 |
| DINP Generic plasticizer, Di-Isononyl Phthalate | 86.00 | 86.00 | 86.00 | 82.00 | | 86.00 |
| Synplast TOTM plasticizer | | | | | 89 | |
| Epoxidized Soybean Oil (ESO) | 5.00 | 5.00 | 5.00 | 5.00 | 5.00 | 5.00 |
| Ground and uncoated CALCIUM CARBONATE 3.5U, particle size from 2.5 to 3.5 um | 19.00 | 19.00 | 19.00 | 0.00 | 0.00 | 19.00 |
| CAL-CARB 2.0TR (OPTIFIL T) from, which is treated calcium carbonate with particle size of from 1.2 to 1.8 um from Huber Engineered Materials | 45.00 | 45.00 | 45.00 | 0.00 | 0.00 | 45.00 |
| Fully Refined Paraffin Wax 1, Paraffin Wax 165 from Honeywell as lubricant | 0.50 | 0.50 | 0.50 | 0.50 | 0.50 | 0.50 |
| Expancel 930 DU120 used as blowing agent | | | | | | 2.00 |

TABLE 3-continued

| Ingredients | Comp. A | Comp. B | Example 1 | Comp. C | Comp. D | Comp. E |
|---|---|---|---|---|---|---|
| METEOR BLACK 9880 carbon black used to check how much the material to be left after peeling testing | 1.00 | 1.00 | 1.00 | 1.00 | 1.00 | 1.00 |
| Total, phr | 258.50 | 258.50 | 258.50 | 190.50 | 197.50 | 260.50 |
| | Mixing and Milling/Pelletizing | | | | | |
| Equipment | Henschel 10 liter mixer | | | | | |
| Mixing speed, rpm | colspan 900 | | | | | |
| Order to addition of Ingredients | PVC resin, stabilizer, plasticizer, lubricants, calcium carbonate and carbon black/blowing agent | | | | | |
| Drop Temperarure, ° F. | colspan 205 | | | | | |
| Form of product | free flow powder | | | | | |
| Equipment | Banbury | | | | | |
| Mixing speed, rpm | colspan 90 | | | | | |
| Chamber Temperature, ° F. | colspan 300 | | | | | |
| Drop Temperature, ° F. | colspan 280~290 | | | | | |
| | Two Roll Mill with 0.14 in. gap | | | | | |
| Rear Roll Temperature, ° F. | colspan 285~290 | | | | | |
| Front Roll Temperature, ° F. | colspan 270~275 | | | | | |
| Rear Roll Mixing speed, rpm | colspan 25 | | | | | |
| Front Roll Mixing speed, rpm | colspan 17 | | | | | |
| Time on mill | until thoroughly mixed | | | | | |
| Form of product | Kept the milled slabs in freezer for overnight and then cut into cubes | | | | | |
| | Injection Molding of Flexible Overmolding Layer Over Rigid PVC Plaque | | | | | |
| Equipment | colspan 85T Van Dorn Molding machine | | | | | |
| Rear Barrel Temperature, ° F. | 335 | 335 | 335 | 335 | 335 | 335 |
| Center Barrel Temperature, ° F. | 340 | 340 | 340 | 340 | 340 | 340 |
| Front Barrel Temperature, ° F. | 350 | 350 | 350 | 350 | 350 | 350 |
| Nozzle Barrel Temperature, ° F. | 340 | 340 | 340 | 340 | 340 | 340 |
| Screw Speed, rpm | 100 | 100 | 100 | 100 | 100 | 100 |
| Injection speed, in/sec | 0.8 | 0.8 | 0.8 | 0.8 | 0.8 | 0.8 |
| Injection pressure, psig | 776 | 714 | 584 | 555 | 548 | 688 |
| Hold pressure, psig | 400 | 400 | 400 | 400 | 400 | 400 |
| Short size, inch | 2 | 2 | 2 | 2 | 2 | 2 |
| Cushion, inch | 0.216 | 0.205 | 0.196 | 0.196 | 0.19 | 0.3 |
| Hold time, second | 4 | 4 | 4 | 4 | 4 | 4 |
| Cooling time, second | 40 | 40 | 40 | 40 | 40 | 40 |
| | Modified ASTM D903 Adhesion Peel Strength Test | | | | | |
| | Failure Mode: Cohesive = C and Adhesive = A | | | | | |
| Peel strength, (lb/in) | 7.02 | 9.20 | >13.77 | 4.60 | 4.17 | 10.92 |
| Failure Mode | A | A | C | A | A | A |

TABLE 4

| Ingredients | Ex. 2 | Ex. 3 | Ex. 4 | Ex. 5 | Ex. 6 | Ex. 7 | Comp. F | Ex. 8 | Ex. 9 | Ex. 10 |
|---|---|---|---|---|---|---|---|---|---|---|
| SUSP RESIN OV195F PVC resin from Oxyvinyls (K Value: 60, IV: 0.79) | 100.00 | 100.00 | 100.00 | 100.00 | 100.00 | 100.00 | 100.00 | 100.00 | 100.00 | 100.00 |
| MARK 4716, Barium zinc phosphite liquid stabilizer from Galata Chemicals | 2.00 | 2.00 | 2.00 | 2.00 | 2.00 | 2.00 | 2.00 | 2.00 | 2.00 | 2.00 |
| Di- Isononyl Phthalate Plasticizer | 86.00 | 86.00 | 86.00 | 86.00 | 86.00 | 86.00 | 86.00 | 86.00 | 86.00 | 86.00 |
| Epoxidized Soybean Oil | 5.00 | 5.00 | 5.00 | 5.00 | 5.00 | 5.00 | 5.00 | 5.00 | 5.00 | 5.00 |
| Ground and uncoated CALCIUM CARBONATE 3.5 μm, particle size from 2.5 to 3.5 μm | 19.00 | 19.00 | | | | | | | | |

TABLE 4-continued

| Ingredients | Ex. 2 | Ex. 3 | Ex. 4 | Ex. 5 | Ex. 6 | Ex. 7 | Comp. F | Ex. 8 | Ex. 9 | Ex. 10 |
|---|---|---|---|---|---|---|---|---|---|---|
| CAL-CARB 2.0TR (OPTIFIL T) treated calcium carbonate 1.2 μm to 1.8 μm particle size (Huber) | 45.00 | 45.00 | | | | | | | | 64.00 |
| KOTAMITE, 3.0 μm Treated GCC calcium carbonate | | | 64.00 | | | | | | | |
| Omyacarb UFT, 1 μm GCC treated calcium carbonate | | | | 64.00 | | | | | | |
| Omyacarb FT, 1.4 μm wet GCC calcium carbonate | | | | | 64.00 | | | | | |
| Magnum Gloss SAT, 0.4 μm PCC treated calcium carbonate | | | | | | 64.00 | | | 32.00 | |
| Magnum Gloss M, 0.4 μm PCC non-treated calcium carbonate | | | | | | | 64.00 | | 32.00 | |
| ULTRAPFLEX treated calcium carbonate with 0.07 μm particle | | | | | | | | 64.00 | | |
| Fully Refined Paraffin Wax 165 from Honeywell | 0.50 | | | | | | | | | |
| Stearic acid FDA NF listed, lubricant | | 0.20 | 0.20 | 0.20 | 0.20 | 0.20 | 0.20 | 0.20 | 0.20 | 0.20 |
| Carbon black, UV grade | | 1.00 | 1.00 | 1.00 | 1.00 | 1.00 | 1.00 | 1.00 | 1.00 | 1.00 |
| METEOR BLACK 9880 carbon black | 1.00 | | | | | | | | | |
| Total, PHR | 258.50 | 258.20 | 258.20 | 258.20 | 258.20 | 258.20 | 258.20 | 258.20 | 258.20 | 258.20 |

Mixing and Milling/Pelletizing

| | |
|---|---|
| Equipment | Henschel 10 liter mixer |
| Mixing speed, rpm | 950 |
| Order to addition of Ingredients | PVC resin, stabilizer, plasticizer, lubricants, calcium carbonate and carbon black |
| Drop Temperature, °F. | 205 |
| Form of product | free flow powder |
| Equipment | Banbury |
| Mixing speed, rpm | 90 |
| Chamber Temperature °F. | 300 |
| Drop Temperature, °F. | 290~305 |

Two Roll Mill with 0.14 in. gap

| | |
|---|---|
| Rear Roll Temperature, °F. | 270 |
| Front Roll Temperature, °F. | 285 |
| Rear Roll Mixing speed, rpm | 25 |
| Front Roll Mixing speed, rpm | 17 |

TABLE 4-continued

| Ingredients | Ex. 2 | Ex. 3 | Ex. 4 | Ex. 5 | Ex. 6 | Ex. 7 | Comp. F | Ex. 8 | Ex. 9 | Ex. 10 |
|---|---|---|---|---|---|---|---|---|---|---|
| Time on mill | until thoroughly mixed | | | | | | | | | |
| Form of product | Kept the milled slaps in freezer for overnight and then cut into cubes | | | | | | | | | |
| | Injection Molding of Flexible Overmolding Layer Over Rigid PVC Plaque | | | | | | | | | |
| Equipment | colspan: 85T Van Dorn Molding Machine | | | | | | | | | |
| Rear Barrel Temperature, ° F. | 335 | 335 | 335 | 335 | 335 | 335 | 335 | 335 | 335 | 335 |
| Center Barrel Temperature, ° F. | 340 | 340 | 340 | 340 | 340 | 340 | 340 | 340 | 340 | 340 |
| Front Barrel Temperature, ° F. | 350 | 350 | 350 | 350 | 350 | 350 | 350 | 350 | 350 | 350 |
| Nozzle Barrel Temperature, ° F. | 340 | 340 | 340 | 340 | 340 | 340 | 340 | 340 | 340 | 340 |
| Screw Speed, rpm | 70 | 70 | 70 | 70 | 70 | 70 | 70 | 70 | 70 | 70 |
| Injection speed, in/sec | 0.8 | 0.8 | 0.8 | 0.8 | 0.8 | 0.8 | 0.8 | 0.8 | 0.8 | 0.8 |
| Injection pressure, psig | 602 | 614 | 573 | 574 | 591 | 591 | 636 | 587 | 562 | 602 |
| Hold pressure, Psig | 400 | 400 | 400 | 400 | 400 | 400 | 400 | 400 | 400 | 400 |
| Short size, inch | 2 | 2 | 2 | 2 | 2 | 2 | 2 | 2 | 2 | 2 |
| Cushion, inch | 0.212 | 0.201 | 0.196 | 0.194 | 0.187 | 0.187 | 0.176 | 0.176 | 0.174 | 0.165 |
| Hold time, second | 4 | 4 | 4 | 4 | 4 | 4 | 4 | 4 | 4 | 4 |
| Cooling time, seconds | 40 | 40 | 40 | 40 | 40 | 40 | 40 | 40 | 40 | 40 |
| | Modified ASTM D903 Adhesion Peel Strength Test | | | | | | | | | |
| | Failure Mode: Cohesive = C and Adhesive = A | | | | | | | | | |
| Peel strength, (lb/in) | >9.52 | >8.34 | >7.49 | >7.31 | >7.95 | >7.98 | 4.78 | >9.32 | >7.86 | >8.53 |
| Failure Mode | C | C | C | C | C | C | A | C | C | C |

TABLE 5

| Ingredients | Ex. 11 | Ex. 12 | Ex. 13 | Ex. 14 | Comp. G | Comp. H | Ex. 15 | Ex. 16 |
|---|---|---|---|---|---|---|---|---|
| SUSP RESIN OV195F PVC (K Value: 60, IV: 0.79) | 100.00 | 100.00 | 100.00 | 80.00 | 100.00 | 100.00 | 100.00 | 100.00 |
| Geon E-44 PVC resin (PolyOne) | | | | 20.00 | | | | |
| MARK 4716, Barium zinc phosphite liquid stabilizer from Galata Chemicals | 2.00 | 2.00 | 2.00 | 2.00 | 2.00 | 2.00 | 2.00 | 2.00 |
| Di- Isononyl Phthalate | 86.00 | | | 86.00 | 86.00 | 86.00 | 86.00 | 86.00 |
| Synplast TOTM plasticizer | | 86.00 | | | | | | |
| Palamoll 654 polymeric plasticizer | | | 84.00 | | | | | |
| Epoxidized Soybean Oil | 5.00 | 5.00 | 5.00 | 5.00 | 5.00 | 5.00 | 5.00 | 5.00 |
| Omyacarb UFT, 1 μm GCC treated calcium carbonate | 64.00 | 64.00 | 64.00 | 64.00 | 20.00 | 40.00 | 80.00 | 100.00 |
| Stearic acid FDA NF listed, lubricant | 0.20 | 0.20 | 0.20 | 0.20 | 0.20 | 0.20 | 0.20 | 0.20 |
| Carbon black UV grade | 1.00 | 1.00 | 1.00 | 1.00 | 1.00 | 1.00 | 1.00 | 1.00 |
| Total, phr | 258.20 | 258.20 | 256.20 | 258.20 | 214.20 | 234.20 | 274.20 | 294.20 |
| | Mixing and Milling/Pelletizing | | | | | | | |
| Equipment | Henschel 10 liter mixer | | | | | | | |
| Mixing speed, rpm | colspan: 1000 | | | | | | | |

TABLE 5-continued

| Ingredients | Ex. 11 | Ex. 12 | Ex. 13 | Ex. 14 | Comp. G | Comp. H | Ex. 15 | Ex. 16 |
|---|---|---|---|---|---|---|---|---|
| Order to addition of Ingredients | PVC resin, stabilizer, plasticizer, lubricants, calcium carbonate and carbon black | | | | | | | |
| Drop Temperature, °F. | colspan: 205 | | | | | | | |
| Form of product | free flow powder | | | | | | | |
| Equipment | Banbury | | | | | | | |
| Mixing speed, rpm | colspan: 100 | | | | | | | |
| Chamber Temperature, °F. | colspan: 300 | | | | | | | |
| Drop Temperature, °F. | colspan: 290 | | | | | | | |
| | Two Roll Mill with 0.12 in. gap | | | | | | | |
| Rear Roll Temperature, °F. | colspan: 270 | | | | | | | |
| Front Roll Temperature, °F. | colspan: 290 | | | | | | | |
| Rear Roll Mixing speed, rpm | colspan: 24 | | | | | | | |
| Front Roll Mixing speed, rpm | colspan: 28 | | | | | | | |
| Time on mill | until thoroughly mixed | | | | | | | |
| Form of product | Kept the milled slaps in freezer for overnight and then cut into cubes | | | | | | | |
| | Injection Molding of Flexible Overmolding Layer Over Rigid PVC Plaque | | | | | | | |
| Equipment | colspan: 85T Van Dorn Molding machine | | | | | | | |
| Rear Barrel Temperature, °F. | 330 | 330 | 330 | 330 | 330 | 330 | 330 | 330 |
| Center Barrel Temperature, °F. | 340 | 340 | 340 | 340 | 340 | 340 | 340 | 340 |
| Front Barrel Temperature, °F. | 350 | 350 | 350 | 350 | 350 | 350 | 350 | 350 |
| Nozzle Barrel Temperature, °F. | 350 | 350 | 350 | 350 | 350 | 350 | 350 | 350 |
| Screw Speed, rpm | 90 | 90 | 90 | 90 | 90 | 90 | 90 | 90 |
| Injection speed, in/sec | 0.8 | 0.8 | 0.8 | 0.8 | 0.8 | 0.8 | 0.8 | 0.8 |
| Injection pressure, psig | 575 | 649 | 745 | 614 | 542 | 575 | 603 | 614 |
| Hold pressure, psig | 400 | 400 | 400 | 400 | 400 | 400 | 400 | 400 |
| Short size, inch | 2 | 2 | 2 | 2 | 2 | 2 | 2 | 2 |
| Cushion, inch | 0.205 | 0.203 | 0.19 | 0.196 | 0.194 | 0.194 | 0.183 | 0.176 |
| Hold time, second | 4 | 4 | 4 | 4 | 4 | 4 | 4 | 4 |
| Cool time, (sec.) | 40 | 40 | 40 | 40 | 40 | 40 | 40 | 40 |
| | Modified ASTM D903 Adhesion Peel Strength Test Failure Mode: Cohesive = C and Adhesive = A | | | | | | | |
| Peel strength, (lb/in) | >7.2 | >6.6 | >8.8 | >6.1 | 4.2 | 5.4 | >11.8 | >9.9 |
| Failure Mode | C | C | C | C | A | A | C | C |

TABLE 6

| Ingredients | Comp. I | Comp. J | Ex. 17 | Ex. 18 | Ex. 19 | Ex. 20 |
|---|---|---|---|---|---|---|
| SUSP RESIN OV195F PVC resin from Oxyvinyls (K Value: 60, IV: 0.79) | | 100.00 | 100.00 | 100.00 | 100.00 | 100.00 |
| SUSP RESIN OV 240 PAS@ Bulk Rail from Oxyvinyls (K value: 70, IV: 1.02) | 100.00 | | | | | |
| NAFTOSAFE PLP-3000 (calcium zinc stabilizer) from Chemson Inc. | 2.10 | 2.10 | 2.10 | 2.10 | 2.10 | 2.10 |
| IROGRAN PS 455-200 Thermoplastic Polyurethane Elastomer from Huntsman | 40.00 | 40.00 | 40.00 | 40.00 | 40.00 | 40.00 |
| WESTON EHDP (2 Ethyl Hexyl Diphenyl Phosphite) from Addivant Corporation | 1.00 | 1.00 | 1.00 | 1.00 | 1.00 | 1.00 |
| Synplast TOTM plasticizer | 90.00 | 90.00 | 90.00 | 90.00 | 90.00 | |
| Palamoll 654 polymeric plasticizer | | | | | | 85.00 |
| Epoxidized Soybean Oil (ESO) | 5.00 | 5.00 | 5.00 | 5.00 | 5.00 | 5.00 |
| Omyacarb UFT, 1u GCC treated calcium carbonate from Omya | | | 40.00 | 64.00 | 80.00 | 64.00 |

TABLE 6-continued

| Ingredients | Comp. I | Comp. J | Ex. 17 | Ex. 18 | Ex. 19 | Ex. 20 |
|---|---|---|---|---|---|---|
| Paraloid K120ND, acrylic based processing aid from Dow Chemical | 1.75 | 1.75 | 1.75 | 1.75 | 1.75 | 1.75 |
| PARALOID K-175, acrylic based processing aid from Dow | 1.50 | 1.50 | 1.50 | 1.50 | 1.50 | 1.50 |
| OPE -AC-629A Oxidized Polyethylene Homopolymer from Honeywell | 0.20 | 0.20 | 0.20 | 0.20 | 0.20 | 0.20 |
| Carbon black UV grade used to check how much the material to be left after peeling testing | 1.00 | 1.00 | 1.00 | 1.00 | 1.00 | 1.00 |
| Total, phr | 242.55 | 242.55 | 282.55 | 306.55 | 322.55 | 301.55 |
| *Mixing and Milling/Pelletizing* | | | | | | |
| Equipment | Henschel 10 liter mixer | | | | | |
| Mixing speed, rpm | 680 | | | | | |
| Order to addition of Ingredients | PVC resin, stabilizer, plasticizer, lubricants, calcium carbonate and carbon black | | | | | |
| Drop Temperature, ° F. | 210 | | | | | |
| Form of product | free flow powder | | | | | |
| Equipment | Banbury | | | | | |
| Order of addition of Ingredients | Melt the above made PVC free flow powder compound up to 300 F., then added IROGRAN PS 455-200 TPU into the melt | | | | | |
| Mixing speed, rpm | 90 | | | | | |
| Chamber Temperature, ° F. | 330 | | | | | |
| Drop Temperature, ° F. | 330 | | | | | |
| *Two Roll Mill with 0.12 in. gap* | | | | | | |
| Rear Roll Temperature, ° F. | 340 | | | | | |
| Front Roll Temperature, ° F. | 325 | | | | | |
| Rear Roll Mixing speed, rpm | 24 | | | | | |
| Front Roll Mixing speed, rpm | 17 | | | | | |
| Time on mill | until thoroughly mixed | | | | | |
| Form of product | Kept the milled slaps in freezer for overnight and then cut into cubes | | | | | |
| *Injection Molding of Flexible Overmolding Layer Over Rigid PVC Plaque* | | | | | | |
| Equipment | 85T Van Dorn Molding machine | | | | | |
| Rear Barrel Temperature, ° F. | 335 | 335 | 335 | 335 | 335 | 335 |
| Center Barrel Temperature, ° F. | 340 | 340 | 340 | 340 | 340 | 340 |
| Front Barrel Temperature, ° F. | 350 | 350 | 350 | 350 | 350 | 350 |
| Nozzle Barrel Temperature, ° F. | 350 | 350 | 350 | 350 | 350 | 350 |
| Screw Speed, rpm | 100 | 100 | 100 | 100 | 100 | 100 |
| Injection speed, in/sec | 0.8 | 0.8 | 0.8 | 0.8 | 0.8 | 0.8 |
| Injection pressure, psig | 790 | 631 | 691 | 702 | 742 | 790 |
| Hold pressure, psig | 400 | 400 | 400 | 400 | 400 | 400 |
| Short size, inch | 2 | 2 | 2 | 2 | 2 | 2 |
| Cushion, inch | 0.205 | 0.201 | 0.205 | 0.196 | 0.203 | 0.205 |
| Hold time, second | 4 | 4 | 4 | 4 | 4 | 4 |
| Cool time, (sec.) | 40 | 40 | 40 | 40 | 40 | 40 |
| *Modified ASTM D903 Adhesion Peel Strength Test Failure Mode: Cohesive = C and Adhesive = A* | | | | | | |
| Peel strength, (lb/in) | 1.32 | 3.59 | >9.82 | >12.19 | >12.13 | >9.95 |
| Failure Mode | A | A | C & A | C | C | C |

Without undue experimentation, those having ordinary skill in the art can utilize the written description, including the Examples, to make and use the present invention.

All documents cited in the Embodiments of the Invention are incorporated herein by reference in their entirety unless otherwise specified. The citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. A polymer compound, comprising:
    polyvinyl halide having an inherent viscosity of less than about 0.9, as measured by using 0.2 grams of resin in 100 ml of cyclohexanone at 30° C. according to test method ASTM D 1243;
    an effective amount of plasticizer to provide a desired amount of flexibility to the polyvinyl halide and form a plasticized polyvinyl halide compound; and
    stearic acid-treated calcium carbonate fillers, or silane-treated calcium carbonate fillers, or both stearic acid-treated calcium carbonate fillers and silane-treated calcium carbonate fillers dispersed in the plasticized polyvinyl halide compound;
    wherein, when the plasticized polyvinyl halide compound is overmolded as a layer on to a Rigid PVC Test Substrate and undergoes a Modified ASTM D903 Adhesion Peel Strength Test, the layer of plasticized polyvinyl halide compound experiences cohesive failure; and
    wherein the plasticizer is present in an amount of at least about 20 weight parts per hundred weight parts of polyvinyl halide.

2. The polymer compound of claim 1, wherein the polyvinyl halide is polyvinyl chloride.

3. The polymer compound of claim 1, wherein the polyvinyl halide has a weight average molecular weight of from about 39,000 to about 150,000 where the molecular weight is measured by size exclusion chromatography.

4. The polymer compound of claim 1, wherein the polyvinyl halide has an inherent viscosity of from about 0.65 to about 0.85, as measured by using 0.2 grams of resin in 100 ml of cyclohexanone at 30° C. according to test method ASTM D 1243.

5. The polymer compound of claim 1, wherein the plasticizer is selected from the group consisting of phthalates, citrates, soyates, trimellitates, and combinations thereof.

6. The polymer compound of claim 3, wherein the plasticizer is selected from the group consisting of phthalates, citrates, soyates, trimellitates, and combinations thereof.

7. The polymer compound of claim 5, wherein the effective amount of plasticizer ranges from about 20 to about 150 weight parts per one hundred weight parts of polyvinyl halide.

8. The polymer compound of claim 6, wherein the effective amount of plasticizer ranges from about 20 to about 150 weight parts per one hundred weight parts of polyvinyl halide.

9. The polymer compound of claim 7, wherein the effective amount of plasticizer ranges from about 40 to about 100 weight parts per one hundred weight parts of polyvinyl halide.

10. The polymer compound of claim 8, wherein the effective amount of plasticizer ranges from about 40 to about 100 weight parts per one hundred weight parts of polyvinyl halide.

11. The polymer compound of claim 9, wherein:
the calcium carbonate is Caribbean micritic limestone having a particle size of less than about 10 micrometers and having a purity of above 98%; and
the limestone is treated with coupling agents comprising stearic acid or silane or both.

12. The polymer compound of claim 10, wherein:
the calcium carbonate is Caribbean micritic limestone having a particle size of less than about 10 micrometers and having a purity of above 98%; and
the limestone is treated with coupling agents comprising stearic acid or silane or both.

13. The polymer compound of claim 11, wherein the amount of calcium carbonate ranges from about 64 to about 150 weight parts per one hundred weight parts of polyvinyl halide.

14. The polymer compound of claim 12, wherein the amount of calcium carbonate ranges from about 64 to about 150 weight parts per one hundred weight parts of polyvinyl halide.

15. An overmolded polymer article comprising a layer comprising the polymer compound of claim 1 and a layer of rigid polyvinyl halide.

16. The polymer compound of claim 2, wherein the polyvinyl chloride is alloyed with thermoplastic polyurethane.

17. The polymer compound of claim 16, wherein the plasticizer is selected from the group consisting of phthalates, citrates, soyates, trimellitates, and combinations thereof.

18. The polymer compound of claim 16, wherein:
the calcium carbonate is Caribbean micritic limestone having a particle size of less than about 10 micrometers and having a purity of above 98%; and
the limestone is treated with coupling agents comprising stearic acid or silane or both.

19. The polymer compound of claim 1, wherein the polyvinyl halide is suspension polymerized vinyl chloride.

20. A composition comprising:
polyvinyl halide; and
a plasticizer;
wherein, when the composition is overmolded as a layer on to a Rigid PVC Test Substrate and undergoes a Modified ASTM D903 Adhesion Peel Strength Test, the layer experiences cohesive failure; and
wherein the plasticizer is present in an amount of at least about 20 weight parts per hundred weight parts of polyvinyl halide.

21. The composition of claim 20, wherein the polyvinyl halide has an inherent viscosity of less than about 0.9, as measured by using 0.2 grams of resin in 100 ml of cyclohexanone at 30° C. according to test method ASTM D 1243.

22. The composition of claim 21, wherein the polyvinyl halide has an inherent viscosity of from about 0.65 to about 0.85, as measured by using 0.2 grams of resin in 100 ml of cyclohexanone at 30° C. according to test method ASTM D 1243.

23. The composition of claim 20, wherein the polyvinyl halide has a weight average molecular weight of from about 39,000 to about 150,000 where the molecular weight is measured by size exclusion chromatography.

24. The composition of claim 20, wherein the polyvinyl halide is polyvinyl chloride.

25. The composition of claim 20, wherein the polyvinyl halide is suspension polymerized vinyl chloride.

26. A composition, comprising:
polyvinyl halide having an inherent viscosity of less than 0.9, as measured by using 0.2 grams of resin in 100 ml of cyclohexanone at 30° C. according to test method ASTM D 1243;
plasticizer; and
calcium carbonate present in an amount of from 64 weight parts to 150 weight parts per 100 weight parts of the polyvinyl halide;
wherein the plasticizer is present in an amount of at least about 20 weight parts per hundred weight parts of polyvinyl halide.

27. The composition of claim 26, wherein the polyvinyl halide has an inherent viscosity of from about 0.65 to about 0.85, as measured by using 0.2 grams of resin in 100 ml of cyclohexanone at 30° C. according to test method ASTM D 1243.

28. The composition of claim 26, wherein the polyvinyl halide has a weight average molecular weight of from about 39,000 to about 150,000 where the molecular weight is measured by size exclusion chromatography.

29. The composition of claim 26, wherein the polyvinyl halide is polyvinyl chloride.

30. The composition of claim 26, wherein the polyvinyl halide is suspension polymerized vinyl chloride.

31. An article, comprising:
a layer comprising polyvinyl halide and plasticizer; and
a rigid substrate comprising polyvinyl halide, the rigid substrate in contact with the layer comprising the polyvinyl halide and the plasticizer;
wherein, when a peel force is applied to the layer, the layer experiences cohesive failure before being peeled away from the rigid substrate.

32. The article of claim 31, wherein the polyvinyl halide has an inherent viscosity of less than about 0.9, as measured by using 0.2 grams of resin in 100 ml of cyclohexanone at 30° C. according to test method ASTM D 1243.

33. The article of claim 31, wherein the polyvinyl halide has an inherent viscosity of from about 0.65 to about 0.85, as measured by using 0.2 grams of resin in 100 ml of cyclohexanone at 30° C. according to test method ASTM D 1243.

34. The article of claim 31, wherein the polyvinyl halide is polyvinyl chloride.

35. The article of claim 31, wherein the polyvinyl halide has a weight average molecular weight of from about 39,000 to about 150,000 where the molecular weight is measured by size exclusion chromatography.

36. The article of claim 31, wherein the polyvinyl halide is suspension polymerized vinyl chloride.

37. The composition of claim 20, wherein the plasticizer is present in an amount ranging from about 20 to about 150 weight parts per hundred weight parts of polyvinyl halide.

38. The composition of claim 26, wherein the plasticizer is present in an amount ranging from about 20 to about 150 weight parts per hundred weight parts of polyvinyl halide.

\* \* \* \* \*